United States Patent
Landau et al.

(10) Patent No.: US 7,355,730 B2
(45) Date of Patent: Apr. 8, 2008

(54) OFFICE MACHINE THAT CAN BE REMOTE-MAINTENANCED VIA A COMPUTER NETWORK AND A MANAGEMENT OR/AND SUPPORT OR/AND REPORT OR/AND INFORMATION SYSTEM COMPRISING A PLURALITY OF OFFICE MACHINES

(75) Inventors: Dirk Landau, Düsseldorf (DE); Philipp Antziopoulos, Neuss (DE); Hans-Werner Stottmeister, Korschenbroich (DE)

(73) Assignee: Toshiba TEC Germany Imaging Systems GmbH, Neuss (DE)

( * ) Notice: Subject to any disclaimer, the term of this patent is extended or adjusted under 35 U.S.C. 154(b) by 981 days.

(21) Appl. No.: 10/472,404

(22) PCT Filed: Mar. 12, 2000

(86) PCT No.: PCT/EP02/02712

§ 371 (c)(1),
(2), (4) Date: Sep. 17, 2003

(87) PCT Pub. No.: WO02/078318

PCT Pub. Date: Oct. 3, 2002

(65) Prior Publication Data
US 2004/0100650 A1    May 27, 2004

(30) Foreign Application Priority Data
Mar. 21, 2001 (DE) ................. 101 13 836
Mar. 21, 2001 (DE) ................. 101 13 837

(51) Int. Cl.
*G06F 13/00* (2006.01)

(52) U.S. Cl. .............. 358/1.14; 358/1.9; 358/296; 702/83; 702/188; 709/204; 709/223; 717/173; 399/8

(58) Field of Classification Search ........... 358/1.9, 358/296; 702/83, 188; 709/204, 223; 717/173; 399/8
See application file for complete search history.

(56) References Cited

U.S. PATENT DOCUMENTS 5,550,997 A * 8/1996 Ip et al. ................. 711/103

(Continued)

FOREIGN PATENT DOCUMENTS

EP    0 560 359 A1    9/1993

(Continued)

OTHER PUBLICATIONS

German Examination Report dated Jun. 5, 2002.

(Continued)

*Primary Examiner*—Aung S. Moe
*Assistant Examiner*—Dennis Dicker
(74) *Attorney, Agent, or Firm*—Scott D. Wofsy; Edwards Angell Palmer & Dodge LLP

(57) ABSTRACT

The invention relates to an office machine that comprises an electronic control unit and a data communication interface, wherein internal data of the office machine can be read via the data communication interface and internal data of the office machine can be input. According to the invention, the office machine (10) is associated with a computer unit (20) that is or can be connected to a computer network (24) and that can access internal data of the office machine. Said computer unit is further adapted to allow read-out of internal data of the office machine via the computer network or/and input of internal data of the office machine via the computer network.

25 Claims, 13 Drawing Sheets

U.S. PATENT DOCUMENTS

| | | | |
|---|---|---|---|
| 5,717,737 A | * | 2/1998 | Doviak et al. ............... 455/403 |
| 5,727,248 A | * | 3/1998 | Ogura ........................... 399/8 |
| 5,742,762 A | * | 4/1998 | Scholl et al. ............... 709/200 |
| 5,937,198 A | | 8/1999 | Nelson et al. |
| 5,956,658 A | | 9/1999 | McMahon |

FOREIGN PATENT DOCUMENTS

| | | |
|---|---|---|
| JP | 61-029987 A | 2/1986 |
| JP | 08-331174 A | 12/1996 |
| JP | 10-164181 A | 6/1998 |

OTHER PUBLICATIONS

German Office Action dated Jul. 11, 2006 citing additional prior art.

\* cited by examiner

Fig. 10

Service Report

Machine data

Services provided
| Item no. | Item name | Start time | Finish time |
|---|---|---|---|

Distance driven (km) [24]

Materials used
| Item no. | Item name | Car stock | Quantity | Reorder |
|---|---|---|---|---|
| * | | | | |

Course of malfunction
| SUCA code | Description |
|---|---|

☐ Close servicing report

[ESPOS]  [FSMS]         [Print]  [Save]  [Close]

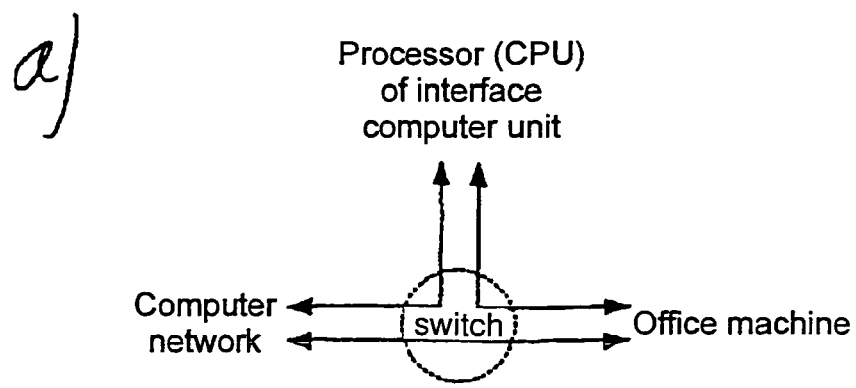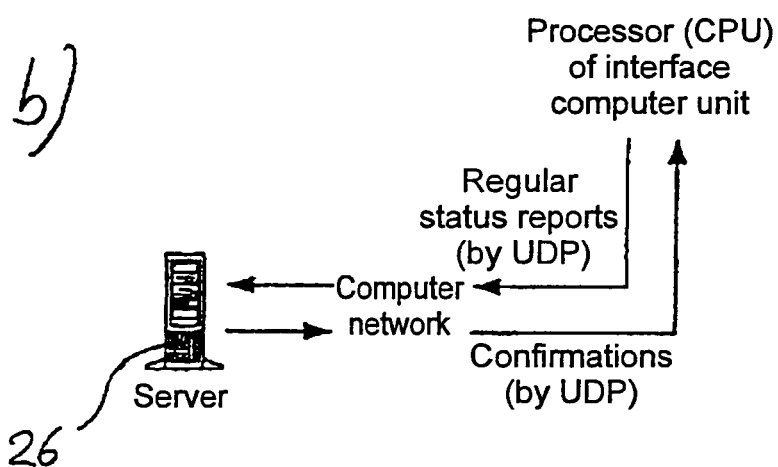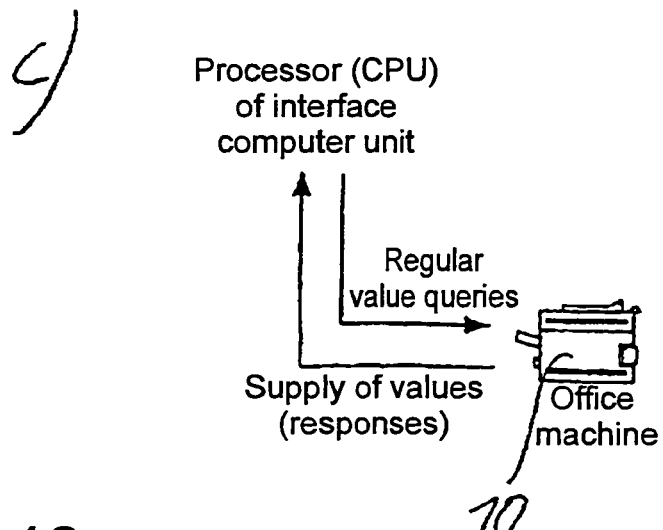
Fig. 12

OFFICE MACHINE THAT CAN BE REMOTE-MAINTENANCED VIA A COMPUTER NETWORK AND A MANAGEMENT OR/AND SUPPORT OR/AND REPORT OR/AND INFORMATION SYSTEM COMPRISING A PLURALITY OF OFFICE MACHINES

DESCRIPTION

According to one aspect, the present invention relates to an office machine which comprises an electronic control unit and a data communication interface, wherein internal data of the office machine may be read out and/or internal data of the office machine are settable via the data communication interface.

Conventionally, with office machines, such as for instance copiers, printers, scanners and fax machines, a service technician has had to read out codes displayed on a display on the office machine or has had to input codes manually in order to configure the office machine. A substantial improvement was achieved by equipping copiers, for example, with serial interfaces which made it possible to read out internal data of the office machine and to set internal data of the office machine. In this manner, a complete set of configuration data may, for example, temporarily be stored on an external device, for example a portable computer, in order to be able to reconfigure the office machine in accordance with the previously applicable configuration after replacement of the control unit or of a memory unit assigned to the control unit. In this manner, it was also possible straightforwardly to update the office machine's firmware, which is stored, for example, in an EEPROM. However, such reading out or setting of internal data of a particular office machine still always required a servicing visit by a technician with the associated servicing costs.

In contrast, the invention proposes that a computer unit connected or connectable to a computer network is assigned to the office machine, which computer unit is capable of accessing internal data of the office machine and is designed to permit reading out of internal data of the office machine over the computer network and/or setting of internal data of the office machine over the computer network. In general, both reading out of internal data and setting of internal data will be provided. For some applications, however, it will be sufficient to provide only reading out of internal data.

In general, it is furthermore proposed that a computer unit is assigned to the office machine, which computer unit is capable of accessing the internal data of the office machine and is designed to permit reading out of internal data of the office machine and/or setting of internal data of the office machine by wireless data communication and/or by data communication over a computer network and/or by data communication over a modem connection.

The proposed invention may bring about a substantial decrease in the number of servicing visits which become necessary as many problems may, to a certain extent, be resolved by "remote servicing" by an external organisation, for instance by an office machine rental company, an office machine dealer or a manufacturer's servicing organisation. For the customer (where the office machine is located), this has the advantage of a higher quality of service, in particular a more rapid service, and the advantage of economies in servicing costs. There are also substantial advantages for the manufacturer or dealer or rental company, namely better customer satisfaction and the possibility of, for example, being able better to meet the requirements of major customers. Furthermore, the receipt of current "field data" from the various office machines to be serviced provides a better overview of the performance of the office machines, such that problems may possibly be discovered in advance and preventive measures may be taken among customers and/or modifications which prevent the problem in question may rapidly be introduced into the current production run of the office machine model in question. The proposed invention furthermore makes it possible to support the office machine, in particular one or more groups of office machines, from a central location, for instance in the manner explained in greater detail below.

The stated wireless data communication may be used for the stated "remote servicing" and/or for access to the internal data of the office machine during a servicing visit by a technician, for instance by means of the technician's portable computer. Wireless data communication may suitably be provided, for example, in accordance with the Bluetooth standard and/or in accordance with a wireless LAN standard.

The computer unit according to the invention may advantageously be designed to query internal data of the office machine in accordance with a predetermined query scheme and/or to transfer report data based on the queried data to an assigned data communication address in accordance with a predetermined reporting scheme. The data communication address may, for example, identify an assigned servicing computer system from which remote servicing and/or monitoring of the office machine is carried out. A convenient development is characterised in that a complete report data record is not always transferred, but instead only changes relative to a previous state are notified.

It is in particular intended that the data communication for reading out and setting of the internal data should proceed on the basis of Internet technology, in particular using the TCP/IP protocol. The individual office machine or the assigned computer unit may then be assigned its own IP address. The computer unit may then advantageously comprise web server functionality or be configured or configurable as a web server. The computer network may then include the Internet and/or an intranet.

It is, however, also entirely possible for the computer network alternatively or additionally to include a LAN or WAN. For example, the data communication on the part of the computer unit or the office machine and/or on the part of an assigned servicing organisation may first pass via a LAN, which comprises a gateway to the Internet.

The electronic control unit of the office machine may constitute the computer unit. In this case, the data communication interface may take the form of a computer network data communication interface. Another possibility is for the computer unit to have its own computer network data communication interface. The latter is in particular convenient when the computer unit is a unit which is in itself external to the office machine, the unit being, for example, connected or connectable to the office machine's data communication interface. A computer unit which is in itself external to the office machine and is yet to be connected to the office machine also makes it possible to retrofit previously supplied office machines in accordance with the proposed invention. The data communication interface of the office machine may, for example, comprise a serial interface or a parallel interface or an Ethernet interface.

It is in particular intended that the office machine should take the form of a copier or the like. More generally, the office machine may take the form of a copier and/or printer and/or fax machine and/or scanner or, in the case of a multifunction device, have corresponding functionalities. To this end, it is in particular proposed that at least some of the following internal data may be read out over the computer network:

serial number of the device and/or at least one internal component of the device, counter reading of a total counter assigned to all paper sources and/or duplicating units of the device, at least one counter reading of a servicing counter and/or accounts counter and/or at least one other counter, optionally at least one counter reading assigned to an individual paper source of the device and/or at least one counter reading assigned to an individual duplicating unit of the device, error messages and/or other status data (for example "paper low" (or "cassette empty") and "toner low" information)

configuration data operating software or firmware version.

In order to be able to offer relatively comprehensive "remote servicing" options, it should be possible to set at least the configuration data of the device over the computer network. It is furthermore convenient for at least one counter, optionally the servicing counter, to be resettable over the computer network. Comprehensive "remote servicing" is furthermore generally understood to include the possibility of updating internal operating software or firmware over the computer network.

A particularly high quality of service may be achieved if the data communication for reading out or setting the internal data (including optional software updating) can be initiated over the computer network by an assigned, optionally external servicing computer unit. Remote servicing may then also be carried out for instance on the office machine or computer unit without any intervention by the customer.

The invention furthermore relates to a system comprising a plurality of office machines according to the invention and at least one servicing computer unit, wherein the computer units assigned to the office machines and the servicing computer unit are in each case connected or connectable to a computer network and are designed such that the servicing computer unit can read out internal data of the office machine by data communication over the computer network and/or that internal data of the office machine can be set by the servicing computer unit by data communication over the computer network and/or internal operating software or firmware can be updated.

The servicing computer unit may be a computer unit of a servicing organisation of the office machine manufacturer, of an office machine dealer, of an office machine rental company or of any other service provider which is capable of accessing the connected office machines in the stated manner for the purposes of remote servicing.

The servicing computer unit may, however, also comprise a computer unit of a servicing or management office of a company or organisation which owns or has possession of the connected office machines, said office supporting the connected office machines in order to maintain the usability thereof and optionally managing them for "facility management" or "fleet management" purposes. Such assignment of the servicing computer unit is particularly useful if a company or organisation uses or would like to use a comparatively large number of office machines. It is then possible to provide for any error messages from the office machines to be evaluated by the servicing computer unit and for an appropriate response to be provided, either in terms of remote servicing by data communication over the computer network or by arranging manual servicing. Current information about counter readings, toner and paper supplies, machine availability together with error messages and error history relating to the assigned office machines can permanently be available on the servicing computer unit. This makes it possible for an appointed individual ("facility manager") to act rapidly and on the basis of reliable information, in order, for example, to notify a customer service technician who can be directly supplied with the necessary data about the machine in question. As described in greater detail below, it is possible to provide for the servicing computer unit also directly to notify an in-house and/or external customer service or technician automatically by data communication or telecommunication, for example by email or SMS. Appropriate remedial action may be taken even before any malfunction or failure of an office machine is noticeable. For example, the facility manager or technician can replenish toner and paper in good time, eliminate paper jams and appropriate remote servicing activities can be initiated.

It should be mentioned that various groups of office machines may be assigned to the servicing computer unit, for example the office machines of a "head office", where the servicing computer unit or the stated facility management office could be accommodated, and office machines for one or more branch offices. In this connection, it is proposed that the servicing computer unit is in communication with computer units which are assigned to a first group of office machines and that the servicing computer unit is in communication over a second computer network with computer units which are assigned to at least one further group of office machines.

The first computer network may include a LAN, WAN or intranet, but not necessarily the Internet. It may, for example, comprise the computer network of the stated head office.

The second computer network may include the Internet. One option is in particular to connect such stated branch offices to the servicing computer unit over the Internet.

A preferred embodiment of the system is characterised in that the servicing computer unit comprises evaluation functionality for the automated evaluation of internal data which have been read out from the office machines and/or reporting functionality for the automated provision of report data and optionally of reports based on the report data to a user interface on the basis of the data which have been read out and optionally of the evaluation or evaluations performed. This may, for example, involve the preparation of user statistics, cost evaluations, or the number of copies, prints, faxed pages, scans etc. which have been made. It may, for example, be provided that the individual services (for instance faxing, scanning, printing, copying in black & white or in colour) are evaluated per device and assigned cost centre. It is also feasible to provide statistical evaluations of the error messages and machine failures which occur, for example in order to determine an average down time relative to the individual machines or machine models and the errors which occur in each case. It is furthermore possible to provide analysis of capacity utilisation, which may preferably be carried out in accordance with selectable criteria, for example in accordance with freely selectable periods or by functionality such as faxing, printing, scanning.

On the basis of the evaluations, in particular statistics, it is possible to ensure elevated availability of the installed office machines (office machine stock) by preventive servicing.

The internal data which have been read out or, preferably, evaluation data based thereon may under certain circumstances also be of interest to external organisations, such as for instance a service provider or machine manufacturer. It may accordingly be provided that such data may be sent by data communication to an assigned computer system of the organisation in question and/or may be retrieved from said organisation.

The possibility has already been mentioned that servicing operations on the assigned office machines may be initiated or at least assisted by means of the servicing computer unit. To this end, it is specifically proposed that the servicing computer unit should have a notification functionality for the automated provision and optional dispatch of data relating to preventive and/or acute servicing operations on at least one of the office machines and/or of messages by data communication and/or telecommunication to at least one assigned communication device and/or at least one assigned further computer unit. It may, for example, be provided that the servicing computer unit directly informs a technician or support person by mobile telephone (acoustically or by SMS message or the like), email, radio paging or other data communication or telecommunication means that servicing or support operations (for instance replenishing toner and paper or removing a paper jam) must be performed on a specific device. The support person may be an employee of the organisation or company itself.

In the event of serious malfunctions or in the event that more complicated work which can only be carried out by a specialist is required, the servicing computer unit can inform an external organisation (in particular a service provider) accordingly. To this end, it is specifically proposed that the assigned further computer unit is assigned to (preferably associated with) a computer-aided servicing management and/or support and/or reporting system. Said system preferably comprises a first computer system including the further computer unit, which computer system keeps master data relating to customers and/or machines potentially requiring servicing, for example office machines such as copiers, printers, scanners and fax machines or multifunction devices comprising corresponding functionalities, in a database and into which query data relating to servicing queries can be input, at least one mobile second computer system which comprises a data communication interface for receiving servicing task data from the first computer system by data communication, in particular by wireless data communication, and for sending report data relating to servicing tasks which have been completed and/or are under way and/or to follow-up servicing tasks and optionally spare parts order data to the first computer system by data communication, in particular by wireless data communication. On the basis of the master data and the query data, the first computer system preferably automatically generates servicing task data and transfers the latter to the second computer system, optionally initiated by the latter, by data communication. It may alternatively or additionally be provided that the second computer system automatically transfers report data to the first computer system by data communication.

It is specifically intended in this connection that the notification functionality is designed, as a function of the internal data which have been read out, to input query data relating to servicing queries into the first computer system by means of the further computer unit. It may furthermore be provided that the reporting functionality is designed to send report data to the first computer system by means of the further computer unit.

The invention furthermore also relates to an overall system which comprises the system according to the invention and the above-mentioned computer-aided servicing management and/or support and/or reporting system. The invention furthermore relates to an overall system which comprises two or more systems according to the invention as described above and, assigned thereto, a common computer-aided servicing management and/or support and/or reporting system as described above.

Where it is a matter of utilising information based on internal data of the office machines by a higher-level organisation, for example the office machine manufacturer, and supporting local servicing by a higher-level organisation, for example the office machine manufacturer, it may be advantageous additionally to provide a higher-level, computer-aided information system. The invention accordingly furthermore provides an overall system which comprises two or more overall systems as described above together with a common computer-aided information system assigned thereto. The assigned computer-aided information system comprises at least one computer system which keeps information data relating to office machine models and the servicing thereof in a database for retrieval by and/or for sending to a particular servicing management and/or support and/or reporting system by data communication, and/or which has a functionality for receiving and storing in a database and optionally evaluating report data transferred from the servicing management and/or support and/or reporting system by data communication.

With further reference to the notification functionality of the servicing computer unit described above, it is furthermore proposed that the notification functionality is designed, as a function of the internal data which have been read out, to select between two or more assigned communication devices and/or two or more assigned further computer units to which the data and/or messages relating to preventive and/or acute servicing operations on at least one of the office machines are to be provided or sent. This proposed development relates to the possibility already described that, as a function of machine status, a selection is made between various routes of communication and thus between the recipients of the notification or data, in order consequently to provide a response which is appropriate to the circumstances.

A particularly preferred development provides that the servicing computer unit has a broadcast and/or search functionality which, over the computer network, recognises the assigned office machines by means of the particular assigned computer unit. It may, for example, be provided that, in accordance with a predetermined scheme (in particular regularly), the servicing computer unit searches the computer network within a predetermined address range or broadcasts acknowledgement requests to the addresses in said address range in order to recognise newly connected office machines or the computer units according to the invention of these office machines or to initiate an acknowledgement therefrom. In this manner, newly installed office machines can be included without delay in the "facility management" or "fleet management" system. It is furthermore proposed as a development in this respect that the broadcast and/or search functionality responds to recognition of a particular newly assigned office machine and reads out a predetermined data record of internal data from said office machine over the computer network and processes and/or stores it in a predetermined manner. All the machine data of significance to servicing or support (machine model, serial number, local defaults, implemented optional equipment etc.) are, for example, automatically retrieved. The "facility management system" is thus always up to date and new office machines can automatically be included in the support system.

Reference is once more made to the above-mentioned potential development, in accordance with which a computer-aided servicing management and/or support and/or reporting system is assigned to the system and said system belongs to a corresponding overall system. In accordance with this proposed development, servicing task data are automatically generated and transferred to the second computer system, which is generally assigned to a technician, by data communication, and/or report data are automatically transferred to the generally stationary first computer system by data communication. In this case, it is no longer necessary, as in the prior art, to print out the corresponding data on paper and optionally reinput these data into another computer system for further processing. Cost savings are thus achieved and a more rapid response to servicing queries is possible.

A preferred development of the system is characterised in that the first and second computer systems are designed, in a data communication session, automatically to transfer servicing task data relating to at least one new servicing task from the first computer system to the second and to transfer report data relating to at least one completed servicing task from the second computer system to the first. It may be provided in this connection that, when necessary, the report data contain follow-up servicing task data and that the first computer system is designed, on the basis of the follow-up servicing task data and optionally the master data, automatically to generate servicing task data applying to a later point in time and to transfer such data to the second computer system or another second computer system by data communication.

In general, an exchange of short data packets will be sufficient, on the one hand, for the second (mobile) computer system to receive new servicing task data and, on the other, for the second computer system to transfer report data, optionally including data for initiating a follow-up servicing intervention, to the first (generally stationary) computer system. Since this exchange of data according to the proposed development takes place in a single data communication session, i.e. virtually simultaneously, no time delays arise and it is ensured that the completed servicing intervention is correctly recorded by the first computer system without burdening the service technician with this task.

Thanks to the automated transfer of report data to the first computer system, it is generally ensured that the current status of servicing queries or tasks (e.g. "allocated to a technician", "under way" and "completed") is always known on the first computer system and that there is accordingly a complete overview of available personnel and technical resources and these may be used efficiently. The servicing task data may contain customer data, in particular address data, machine location data, servicing contract data, servicing history data and machine data. Servicing history data are, for example, data containing information about malfunctions (for instance the last five malfunctions) which have occurred in the past. In particular, previous servicing interventions can be listed and details stated with regard to the malfunction which occurred, the servicing and repair operations carried out, the spare parts fitted, changes to machine configuration etc. It is, however, also possible for such data to be kept in a local database in the second (mobile) computer system such that the first computer system only needs to transfer to the second computer system updated data for the local database and/or specific servicing tasks relating to individual customers or machines or groups of machines. In general, it is proposed that the second computer system keeps servicing data in a servicing database.

It is proposed that the second computer system is designed automatically to incorporate the servicing task data into a report data record. The technician is thus saved the task of manually inputting data which are already known into the second computer system.

An advantageous embodiment provides that the second computer system has a data communication interface in order to be connected directly or indirectly with a data communication interface of an allocated machine and that the second computer system is designed to read out internal data of the machine and/or to set internal data of the machine by data communication, wherein internal data which have been read out may preferably be incorporated into a report data record by data exchange within the computer. These data then do not need to be read out and input manually. Internal data which have been read out of the machine may advantageously be incorporated into a report data record by data exchange within the computer system. The second computer system preferably has a functionality for automatically reading out a predetermined or predeterminable set of machine status data from an allocated machine. The second computer system may furthermore have a functionality for printing out internal data which have been read out, for example using a locally assigned output device, for instance a fax machine which is available on site.

It is proposed that the second computer system keeps spare parts data in a spare parts database and that the second computer system is designed to incorporate spare parts data from the spare parts database by data exchange within the computer system into a report data record or a separate order data record, which is to be transferred by data communication optionally to a computer system other than the first computer system. In this connection it is possible reliably to avoid errors in that the second computer system is designed, when the spare parts database is accessed, to take account of the data present in a servicing task data record and/or of data which have been read out from an allocated machine for the purpose of preselection and/or checking.

With regard to the spare parts database, it is preferred for said database to comprise a first spare parts database, which relates to spare parts which are in principle available from a spare parts supplier for the machines which are potentially to be serviced, and a second spare parts database, which relates to spare parts which are held in stock locally. The spare parts database or the first and second spare parts databases may be organised in the form of a conventional database. The first spare parts database may appropriately be provided on a removable, high-capacity data storage medium, for instance a CD-ROM or DVD-ROM. The second spare parts database, which may in particular relate to the spare parts present in the technician's car, may appropriately be kept on a local hard drive of the second (mobile) computer system. With regard to the first (general) spare parts database, it may also be mentioned that it may also be entirely convenient not to keep it locally, but instead to provide access to a corresponding database provided at a central location, for instance over the Internet or in general by data communication.

One particularly preferred embodiment of the system or of the second computer system is characterised in that the second computer system is designed, on the basis of the input spare parts data and on the basis of data contained in a servicing task data record and/or data which have been read out from an allocated machine and/or on the basis of the data contained in the spare parts database, automatically to check whether a spare part identified by the spare parts data fulfils the assignment criteria predetermined for an allocated machine. This checking may be designed as a plausibility test. This option is intended for use in the event that, on the basis of his/her experience, the technician gets a spare part from his/her stock (in particular the stock in the technician's vehicle). The correct spare part will usually be selected. However, it is entirely conceivable that the technician will get the wrong spare part, i.e. that another spare part would be the right one or at least better. By means of the proposed development, it is possible to ensure that the technician will if necessary be referred to another spare part. To this end, it is specifically proposed that the second computer system is furthermore designed, on the basis of the predetermined assignment criteria and optionally on the basis of upgrade data (which may also be designated as update data) relating to the allocated machine, to provide a reference to another spare part via a user interface. It is, for example, possible to provide for a list of suitable or advisable spare parts or "upgrade parts" to be offered to the technician on the screen of the second computer.

Another important aspect in this connection is that there could be spare parts corresponding to a more recent modification status or level of machine construction which make it possible to bring previously supplied machines up to the more recent modification status. The checking and optional provision of references in accordance with the proposed development make it possible, on the basis of the upgrade data, to inform the technician of existing upgrade options. In this connection, it is possible to provide the technician with information regarding compatibility between spare parts, on the one hand, and the allocated machine, on the other. Upgrade data may also be included in the spare parts database.

In order, for example, to be able straightforwardly to input spare parts data relating to a specific spare part into the second computer system, it is proposed that an input device for automated reading in of the spare parts data relating to a particular spare part is assigned to the second computer system. The input device may advantageously take the form of an optical or radio frequency-based input device. A bar code reader is a particularly convenient type of optical input device.

It may also be mentioned in relation to the above-stated checking on the basis of assignment criteria that checking may generally very conveniently be performed on the basis of the particular machine's serial number (read out from the allocated machine and/or contained in the servicing task data) which generally identifies the modification status of the machine in accordance with the production run. Previous updates or upgrades to a more recent modification status may be input into modification data kept locally in the machine and/or in modification data, optionally received with the servicing task data, kept on the second computer system.

It is furthermore proposed that the second computer system is designed, on the basis of spare parts data and/or spare parts stock data and/or machine data, which have been manually input or read out from the machine by data communication and preferably include diagnostics data, automatically to generate order data and optionally follow-up servicing task data and to incorporate them into a report data record or a separate order data record, which is to be transferred by data communication optionally to a computer system other than the first computer system. In this manner, errors in the ordering of spare parts are avoided and it is possible to ensure without major effort that spare parts taken from the technician's car stock are reordered or provided to replenish the car stock.

In general, it will be convenient if the second computer system permits manual input of data for incorporation into a report data record. To this end, it is proposed as a development that a user interface is provided which mandatorily requests particularly relevant data.

Important data of relevance to servicing in particular include: technician's driving time to the customer, necessary working time, spare parts fitted, counter readings etc. At least some of these data and optionally even all of these data can be acquired in computer-aided, automated manner and incorporated into the report data record.

The report data record should preferably also include information regarding when the particular machine should next be serviced. On the one hand, this makes it possible to give the customer prior notice and, on the other, permits timely planning on the part of the service provider. Even if servicing is normally carried out in accordance with predetermined servicing intervals, it is generally convenient to give the customer prior notice. Prior notice and appropriate planning on the part of the service provider is in any case required if additional servicing interventions, for instance follow-up servicing interventions to the servicing intervention which has just been performed, are required as well as servicing in accordance with the predetermined servicing intervals.

In general, it will be appropriate and desired by the customer to provide the customer with a printed servicing report. It is furthermore generally appropriate to print out a servicing report as a backup since data loss may occur. In this connection, it is proposed that the second computer system is designed to print out by data communication or telecommunication, preferably by wireless data communication or telecommunication, a servicing report by means of an output device identified by connection or address data. So that it is not necessary for the second computer system to have its own printer, it may be decided to use an output device already present on the customer's premises. It is primarily intended in this connection that the output device is a fax machine connected to a public data communication or telecommunication network.

The second computer system may have further support functionalities to assist the technician, which functionalities are preferably integrated with the above-mentioned functionalities into an application. One possibility is note pad functionality, wherein incorporation of the notes into the report data may be provided.

The invention furthermore relates to a method for supporting and/or remotely servicing and/or managing a plurality of office machines and/or for providing information relating to at least one of the office machines. According to the invention, reading out of internal data of at least one of the office machines and/or setting of internal data of at least one of the office machines by wireless data communication and/or by data communication over a computer network and/or by data communication over a modem connection is provided.

The present invention is explained in more detail with the aid of the attached drawings in which:

FIG. 1 shows an exemplary embodiment of a system according to the invention comprising a plurality of copiers and/or other office devices, which are connected or connectable to the Internet and thus to an assigned servicing computer unit over a particular web server and a LAN.

FIG. 2 shows another exemplary embodiment of a system according to the invention comprising an assigned servicing computer unit, which is connected to the office machines over a LAN/WAN, and a further computer unit, optionally identifiable as a servicing computer unit, which is connected or connectable for data communication over the Internet with the former servicing computer unit and/or with the office devices.

FIGS. 8-10 show further screens of the user interface.

FIG. 12 shows data flow diagrams representing the data paths provided by the computer unit of FIG. 11.

Figure 1:
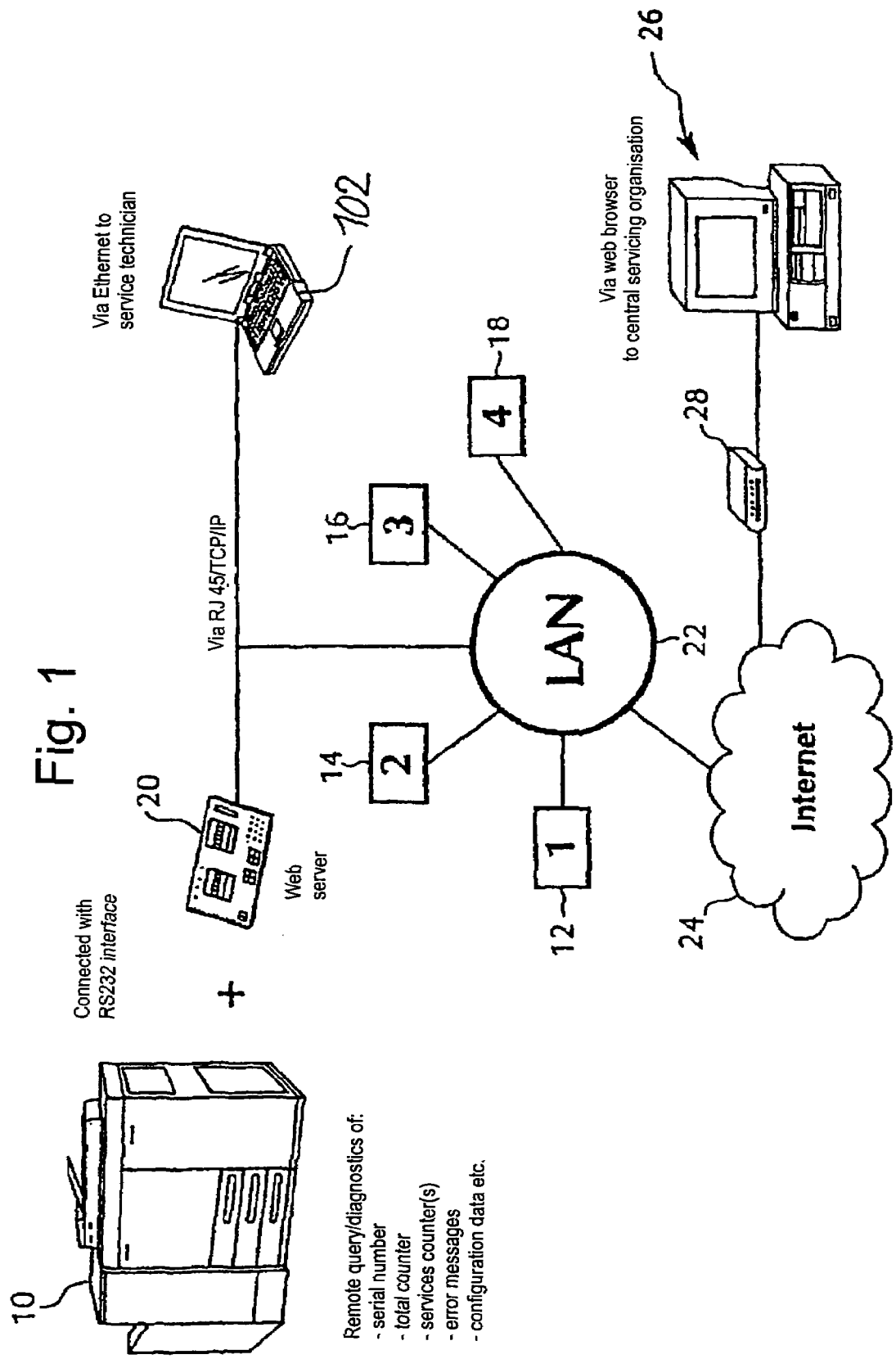

FIG. 1 shows an example of a system according to the invention with a copier 10 and two or more further office machines 12, 14, 16 and 18 represented by blocks 1, 2, 3 and 4, each of which machines is connected or connectable to a LAN 22 via a computer unit (computer unit 20 in the case of copier 10) acting or configurable as a web server, said LAN in turn being connected or connectable to the Internet 24. The office machines 12 to 18 may comprise office machines of a type different from the office machine 10, for example printers, fax machines, scanners or also "multifunction" devices which have several functionalities, for instance at least two of the following functionalities "copier", "printer", "scanner" and "fax machine". A servicing computer system 26 is assigned to the office machines 10 to 18, which system is connected or connectable to the Internet 24 via a modem 28 or the like. Remote servicing relating to the assigned office machines or office devices can be carried out from the servicing computer system 26, which belongs for example to a central servicing organisation, for example by means of a web browser. For example, internal device data, such as serial numbers, counter readings (total counter, one or more servicing counters), error messages or error codes, configuration data etc. can be read out by data communication over the Internet. The following data may be taken into consideration in connection with copiers or the like: machine serial number, total counter, configuration data, error messages (optionally with detailed description), counter readings for assemblies (for instance heater unit or fuser/fixer unit) or components (e.g. drum, heated rollers, feed spindles etc.). In this manner it is possible, for example, to query the number of prints, copies, faxes or scans which have been made to date or within a period of time. Internal data of the office machines can moreover be set by data communication over the Internet. Such activities may in particular comprise configuring the particular device by "remote servicing" over the Internet and updating the particular device's operating software ("firmware"). Counters may also be reset. Accounts data (in particular counter readings) may also be read out over the Internet by means of "remote servicing" so that usage-dependent fees (for instance leasing or rental costs) can be charged.

It may be provided that reading out or setting of internal data may alternatively also proceed "locally" on the office machine itself or via the LAN or an Ethernet, for instance by a service technician by means of a portable computer 102 or the like.

According to the proposed invention, "preventive servicing" of the office machines assigned to the servicing computer system 26 is in particular possible. In the case of a copier/printer/fax machine it is, for example, possible to service the particular machine's electrophotographic process unit, a heater unit ("fuser"), a transport and charge image transfer belt or a charge image transfer drum. In principle, it is possible by data communication over the Internet to carry out any servicing and diagnostics operations which do not require replacement of components (wear or consumable components) nor any other manual intervention on the office machine in question. In accordance with the proposed invention, it is possible to prepare more effectively for any necessary on-site servicing interventions.

By means of the computer unit (computer unit 20 in the case of copier 10) integrated into the office machine or connected thereto, it is preferably possible for the assigned servicing computer system 26 to retrieve from a particular office machine not only data of relevance to servicing (in particular counter readings, error states etc.) but also data of relevance to users (such as paper supply exhausted, toner supply exhausted, paper supply below a threshold value, toner supply below a threshold value etc.). It is not mandatory for said servicing computer system to access the machine's internal data over the Internet or the computer unit operating as a web server in the exemplary embodiment. It may, for example, be provided that the servicing computer system 26 is likewise connected to the LAN 22 (or, together with the computer unit or units acting as web server, to a WAN , intranet or the like). It is, for example, intended that the servicing computer system 26 belongs to a department responsible for supporting the connected office machines for a company or organisation which, in the normal course of operations, makes use of the connected, generally spatially distributed, office machines. It is possible in this manner, for example, to ensure that copiers are always supplied with toner and paper in good time so that a shortage of paper or toner does not result in down time. The same applies to different types of office machines. In this manner, it is also possible to respond quickly to remediable error states, such as paper jams, without calling in an external service.

Such an (internal) servicing computer system 26 may perform further functions required for the purposes of fleet or facility management, such as consumption evaluations, user statistics, cost evaluations (for instance relating to cost centres, number of copies, prints, faxes, scans made etc.), failure statistics, error message statistics, determination of average down time etc. Remote servicing of the above-described type may also be performed by the internal office and/or an external organisation by means of a corresponding servicing computer system, which office or external organisation, for example, directly accesses the computer units assigned to the office machines over the Internet (c.f. configuration of FIG. 1) or accesses the computer units assigned to the office machines and thus the internal data of the particular office machine by the intermediary of the "internal servicing computer system".

Figure 11:
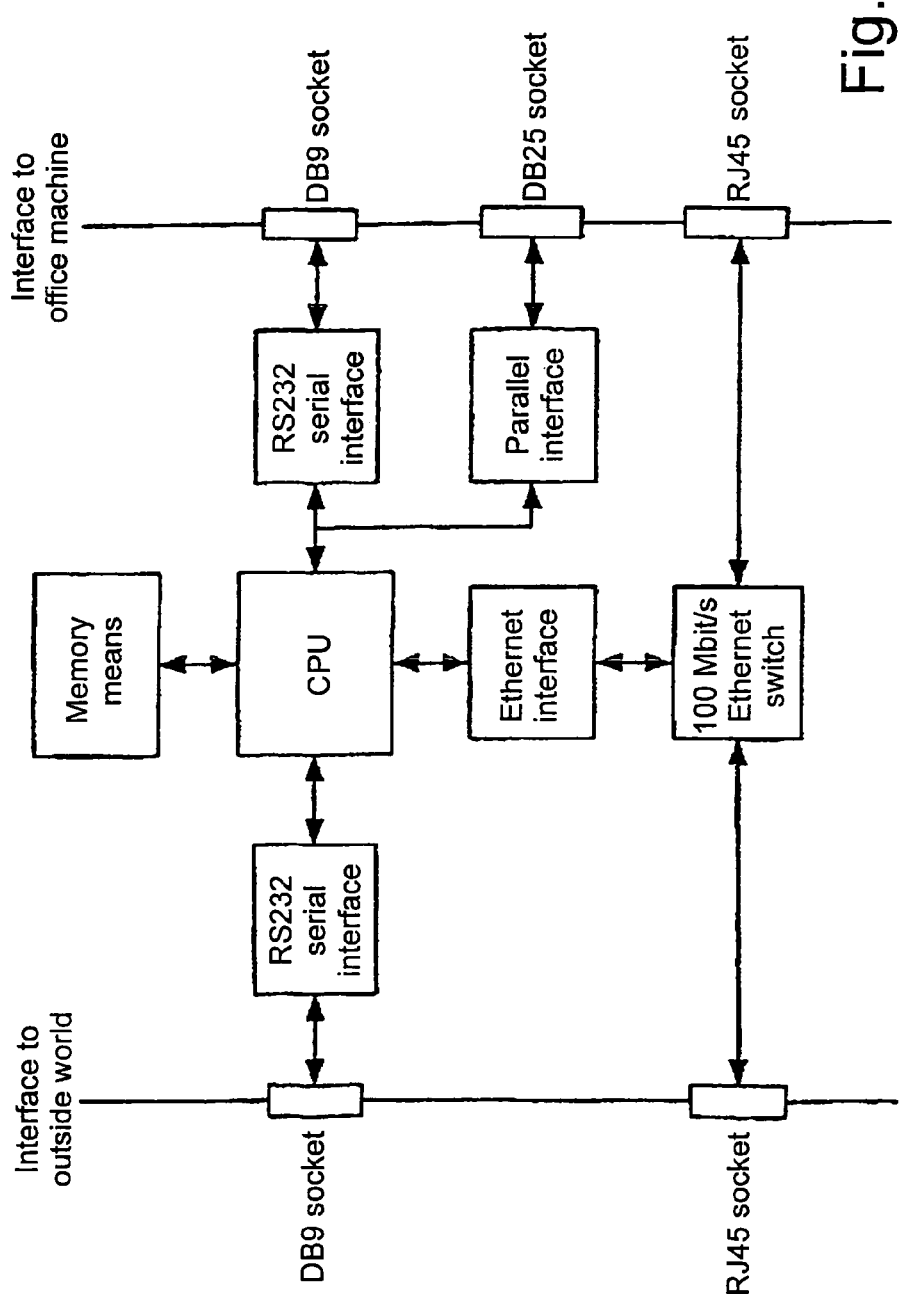
FIG. 11 is a schematic block diagram of an exemplary embodiment of a computer unit which can be designated an interface computer unit (or optionally also as an "interface converter"), which permits remote servicing of an assigned office machine by data communication.

Numerous options are in principle available with regard to the structure and design of the computer unit 20 which enables remote servicing. FIG. 11 is a schematic representation of an example of such an "interface computer unit" which is characterised by numerous connection options. An interface is provided to the assigned office machine, which has three interfaces, namely a serial interface, a parallel interface and an Ethernet interface, which may alternatively be used for connection to the assigned office machine. Depending upon the interfaces fitted to the office machine, one or more of the stated connection options may be used.

The computer unit 20 is furthermore equipped with an interface to the outside world. An Ethernet interface is preferably used for connection to the computer network. A serial interface is additionally present which, by means of a modem, enables communication with a remote modem station or direct dial-in to the Internet.

Both the stated Ethernet interfaces are provided by an Ethernet switch, which enables omnidirectional network communication between the computer network, a processor of the computer unit and the office machine without an external switch or hub being necessary. Reference is made to FIG. 12a. Where supported by the office machine, direct access to internal data of the office machine is also possible from the computer network.

The computer unit may moreover have further interfaces, for example also a wireless data communication interface. One possible example is a Bluetooth interface which makes it easier for a service technician, for instance, to access internal data of the computer unit or, by the intermediary of the computer unit, internal data of the office machine connected to the computer unit. Remote servicing and/or remote monitoring of the office machine may, if desired, also proceed by wireless data communication.

The interface computer unit is equipped with operating software which comprises a network operating system which enables communication via the various interfaces, including all provided protocols. Examples which may be mentioned are the ARP, IP, UDP, TCP, HTTP network standards, together with PPP and FTP for modem operation and data transfer (file transfer). Wireless data communication protocols, for instance Bluetooth, should also be mentioned in this connection. Since, as a rule, only a selection of the interfaces is actually provided, the interfaces may mutually independently be activated or deactivated.

Application software providing various functionalities is also dependent upon the operating software. Functionalities are accordingly available for determining the model of the office machine and for communication with the particular office machine through one of the stated interfaces. A preferred design provides that internal data of the office machine (for example a copier) are periodically queried. It is, for example, possible to use the TOSHIBA FSMS protocol for communication via the serial or parallel interface, or the HTTP protocol, providing that the office machine has an appropriate HTTP server interface (via Ethernet and TCP/IP). FIG. 12c represents the data flow between a processor (CPU) of the interface computer unit and the office machine. The queried data comprise, for example, information concerning counter readings, error states, the degree of wear on wear parts and equipment of the office machine. Normal operation of the office machine is unaffected by the query. The application software is designed to detect interruptions in communication and to resume communication automatically (after a period of waiting).

The queried internal data of the office machine are temporarily stored in a memory means of the computer unit, where they are available for querying from the computer network. A preferred development provides that report data records are sent periodically to an assigned data communication address (c.f. FIG. 12b). The reports may comprise so-called Δ reports (delta reports) which only contain data which have changed since a previous report. Transfer may conveniently proceed using the UDP protocol.

Figure 13:
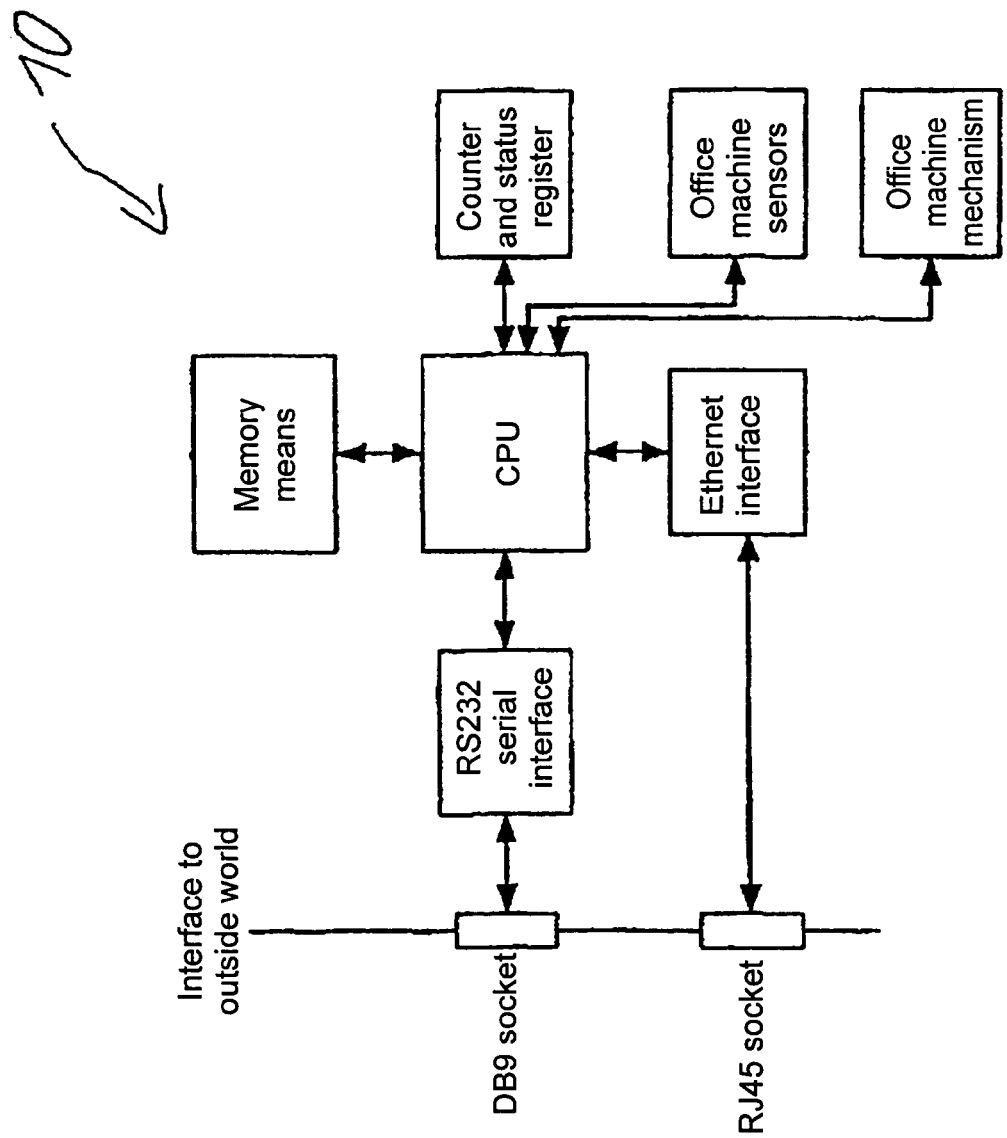
FIG. 13 is a schematic block diagram of an exemplary embodiment of an office machine (for example a copier) which is remotely serviceable by the intermediary of the interface computer unit of FIG. 11 or independently thereof.

FIG. 13 illustrates the structure of an office machine, insofar as it is of interest here. The office machine may, for example, comprise a copier. Queries for data from the assigned interface computer unit are received by the office machine via its interface to the outside world, for example a serial interface or an Ethernet interface. In response to these queries, a processor of the office machine reads the corresponding data out from the internal memory means or from internal registers and counters and sends this information to the interface computer unit via the interface. Error-tolerant handshaking procedures are preferably implemented which ensure reliable data exchange between the office machine and the interface computer unit.

Another option for providing access to the internal data of the office machine provides for the interface computer unit to have direct access to the internal data of the office machine.

A further option is for the functions of the interface computer unit to be carried out by the office machine's own control unit. All that is then required in order to be able to carry out the described remote servicing functions is for the office machine to be connected to the computer network.

It should be mentioned that FIG. 13 only states one example, and that office machines of a different design and optionally having different interfaces may also be incorporated, by means of functionalities internal to the office machine and/or by means of an appropriately developed interface computer unit, into a remote servicing system provided over the computer network.

Figure 2:
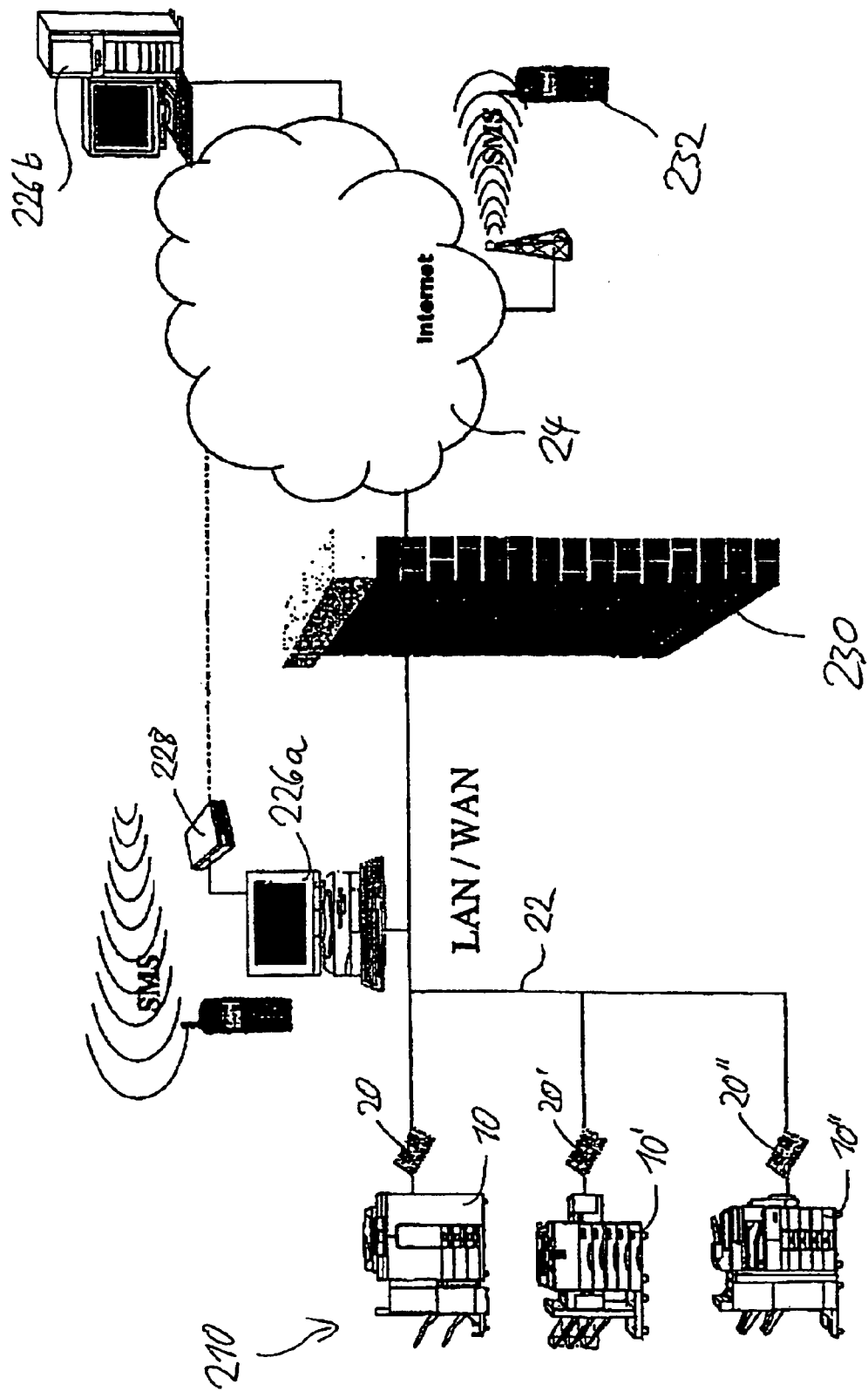

FIG. 2 shows a system according to the invention in which an "internal" servicing computer system 226a has read and/or write access over a LAN/WAN 22 to the computer units 20, 20' and 20" of a group 210 of office machines 10, 10' and 10" and thus to the internal data of these office machines. An external servicing computer system 226b is furthermore provided which, subject to permission by a firewall 230, can access the first-stated servicing computer system 226a over the Internet 24 and, either directly without involving the servicing computer system 226a, or indirectly, namely by the intermediary of said servicing computer system 226a, has read and/or write access by means of the particular office machine computer unit to the internal data of the connected office machines.

It may, however, be provided for security reasons that read and write accesses to the internal data can only be made from the servicing computer system 226a or only when a communication channel through the firewall 230 to the servicing computer system 226b and to the particular office machine computer unit 20, 20' or 20" is held open by the servicing computer system 226a.

Figure 5:
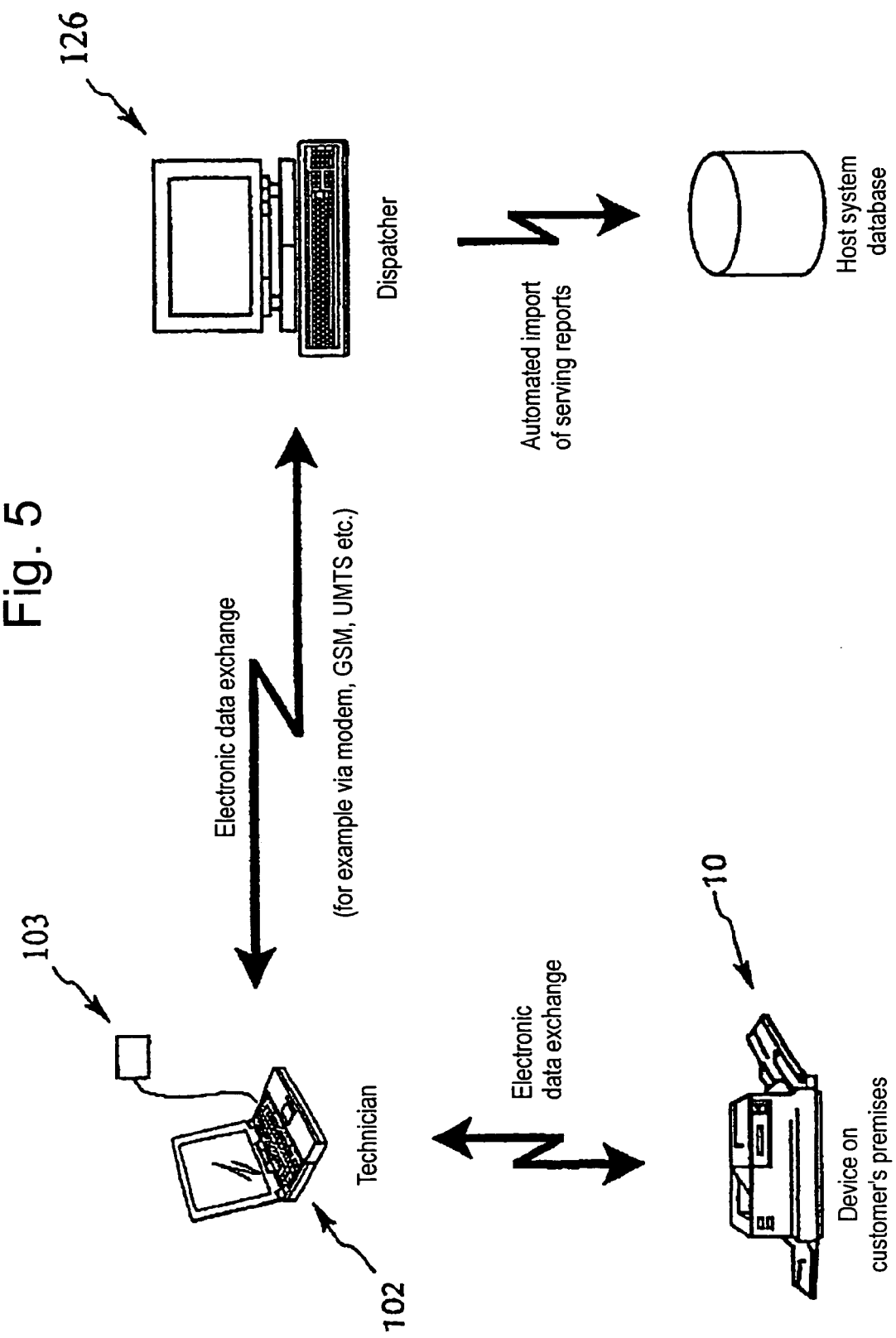
FIG. 5 shows a computer-aided servicing management and support and reporting system assigned to a customer device and a host system which is advantageously usable in combination with or as part of a system according to the invention.

The servicing computer system 226b may additionally or alternatively also perform other functions, in particular the function of supporting servicing interventions and actually instructing technicians to carry out corresponding servicing tasks. The servicing computer system 226b may here assume the role of the dispatcher system 126 of the system shown in FIGS. 5 and 6 which responds to servicing queries from the internal servicing computer system 226a. It may thus happen that the servicing computer system 226a determines, on the basis of its remote monitoring of the connected office machines, that there is a requirement for servicing and that an external servicing organisation should be called in for this purpose. To this end, the internal servicing computer system 226a can transmit, either automatically or in response to appropriate input or confirmation from an operator, corresponding query data (query data relating to one or more servicing queries) or task data by email or other data communication means through the firewall 230 and the Internet 24 to the external servicing computer system 226b. It is also possible alternatively or additionally to use another communication route, namely a modem 228, to the Internet and thus to the external servicing computer system 226b in order to satisfy particularly stringent security requirements with regard to unauthorised external access to the internal computer network.

The external servicing computer system 226b can then instruct assigned technicians to issue to carry out corresponding servicing tasks by data communication or telecommunication, for example to a mobile telephone 232, for example by SMS or also by an acoustic message, or by email to the particular technician's mobile computer and by similar means. Data communication and data transfer are in particular intended, as described below in connection with FIGS. 5 and 6.

It also entirely possible for the internal servicing computer system to give corresponding servicing tasks directly to assigned technicians, who may for example be an in-house technician of the company or organisation to which the internal servicing computer system 226a belongs, or also external technicians who are provided for such intervention by an external servicing organisation. The particular technician may also be notified by data communication or telecommunication to an appropriate terminal device kept by the technician (mobile telephone, portable computer, hand-held computer, radio pager and the like), it being intended in particular that emails, SMS messages and acoustic messages should be sent.

It may advantageously be provided for the internal servicing computer system 226a to evaluate any error states and service requirements which arise in accordance with predetermined criteria and then, as a function of said evaluation, to make a selection from two or more available communication channels, i.e. for example to instruct or notify an "internal" technician for slight malfunctions and simple service requirements and, for more serious error states and service requirements requiring special expertise, to transmit corresponding servicing queries to the external servicing computer system 226b (for example by email, which, for an automated action by the external servicing computer system 226b, preferably complies with a predetermined protocol).

One important aspect of a preferred embodiment of the configuration according to FIG. 2 is that all internal data of the machines can be collected and evaluated centrally by the servicing computer system 226a. As explained, in the event of machine failure or the like, in-house technicians can be notified or the external service provider called out, wherein it is possible for the servicing computer system 226a to handle these emergency notifications or servicing queries entirely automatically. The system 226a, which may optionally be known as a "facility management system", can decide on the basis of predetermined criteria which data should be sent outside through the firewall 230 to the service provider (in particular to the system 226b).

When sending servicing queries to the external provider or when notifying or instructing an in-house technician, data about the office machine in question and the error state or service requirement may also be sent, so that the technician or service provider's system can respond appropriately.

The internal servicing computer system 226a preferably has a functionality to recognise office machines which have been newly connected to the LAN/WAN 22 (or, more generally, to the assigned computer network). To this end, the servicing computer system 226a can regularly search the computer network within a predetermined address range for the presence of newly connected office machine computer units or initiate acknowledgements from newly arrived office machine computer units by broadcasting to a predetermined address range. The latter is a preferred option if, contrary to the preceding explanations, the office machine computer units are designed not only passively to enable reading out or setting of internal data of the office machines but instead actively to notify operating states (for example error states) to the servicing computer system 226a by data communication. However, another option, when the office machine computer units are designed in this manner, is to provide them with a self-registration functionality which, after connection to the computer network, ensures automatic registration on the internal servicing computer system 226a.

Automatic recognition of newly arrived office machines or automatic registration of newly arrived office machines ensure that the servicing computer system 226a is always completely up to date with regard to the connected office machines and that any newly arrived office machines can be included in the support system without delay. Then, once a newly arrived office machine has been recognised, the internal servicing computer system 226a can automatically query relevant machine data (for instance machine model, serial number, defaults and the like), unless these data have already been sent by the office machine computer unit in the event of automatic registration.

Figure 3:
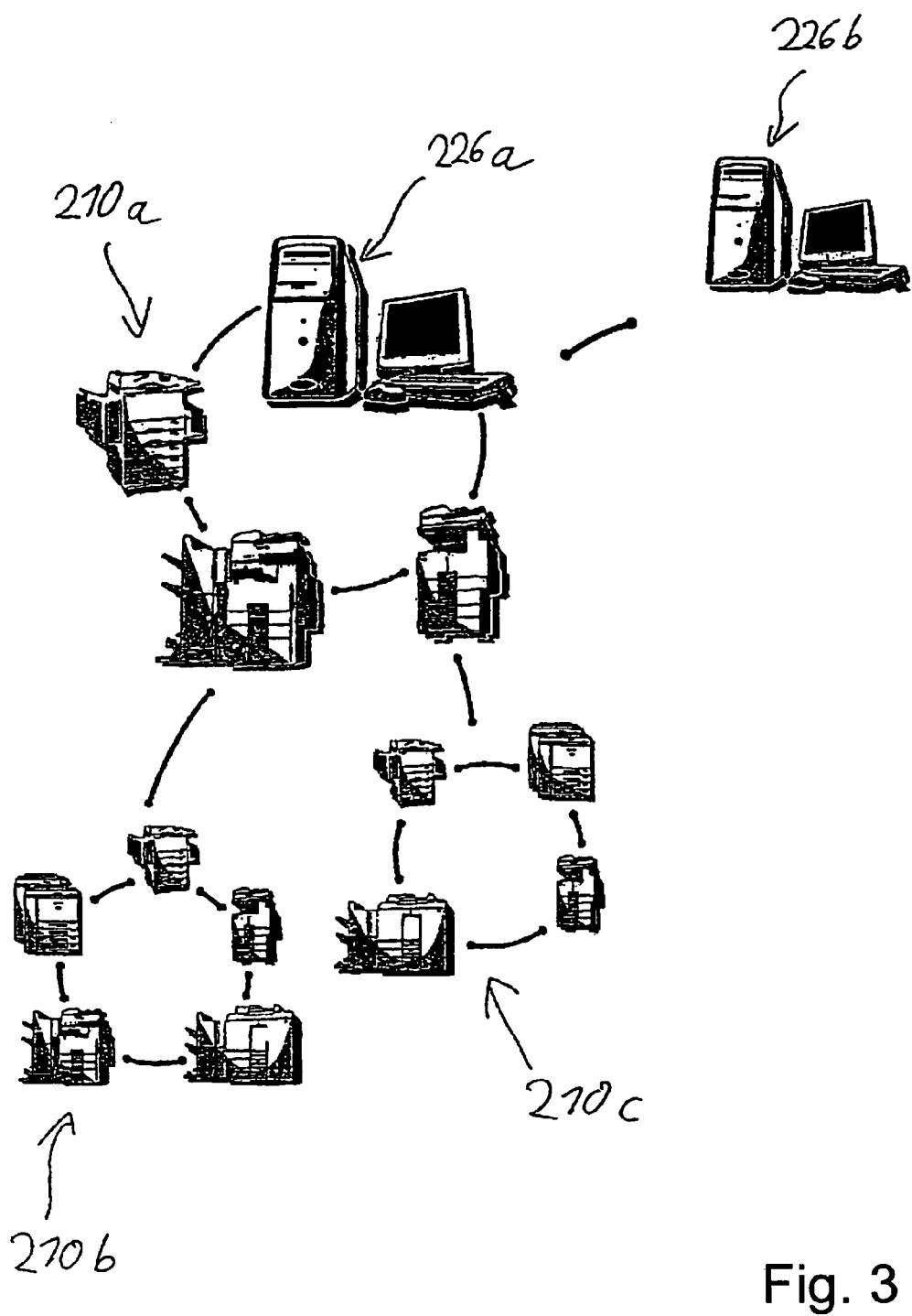
FIG. 3 shows a configuration of the system of FIG. 2 with an installed office machine stock comprising two or more spatially distributed groups of office machines.

It should also be noted that it is straightforwardly possible also to provide support from a central location to various groups of office machines which are spatially distributed and belong, for example, to various branch offices and a head office of a company or organisation. FIG. 3 illustrates such a configuration. In this case, a group of office machines 210a is supported over a LAN/WAN by an internal servicing computer 226a. Furthermore, other groups of office machines 210b and 210c are also included in the support system by the servicing computer 226a over the Internet. The office machines of the particular group may in each case be connected to their own LAN/WAN, from which an Internet gateway is available (preferably through a firewall).

Figure 4:
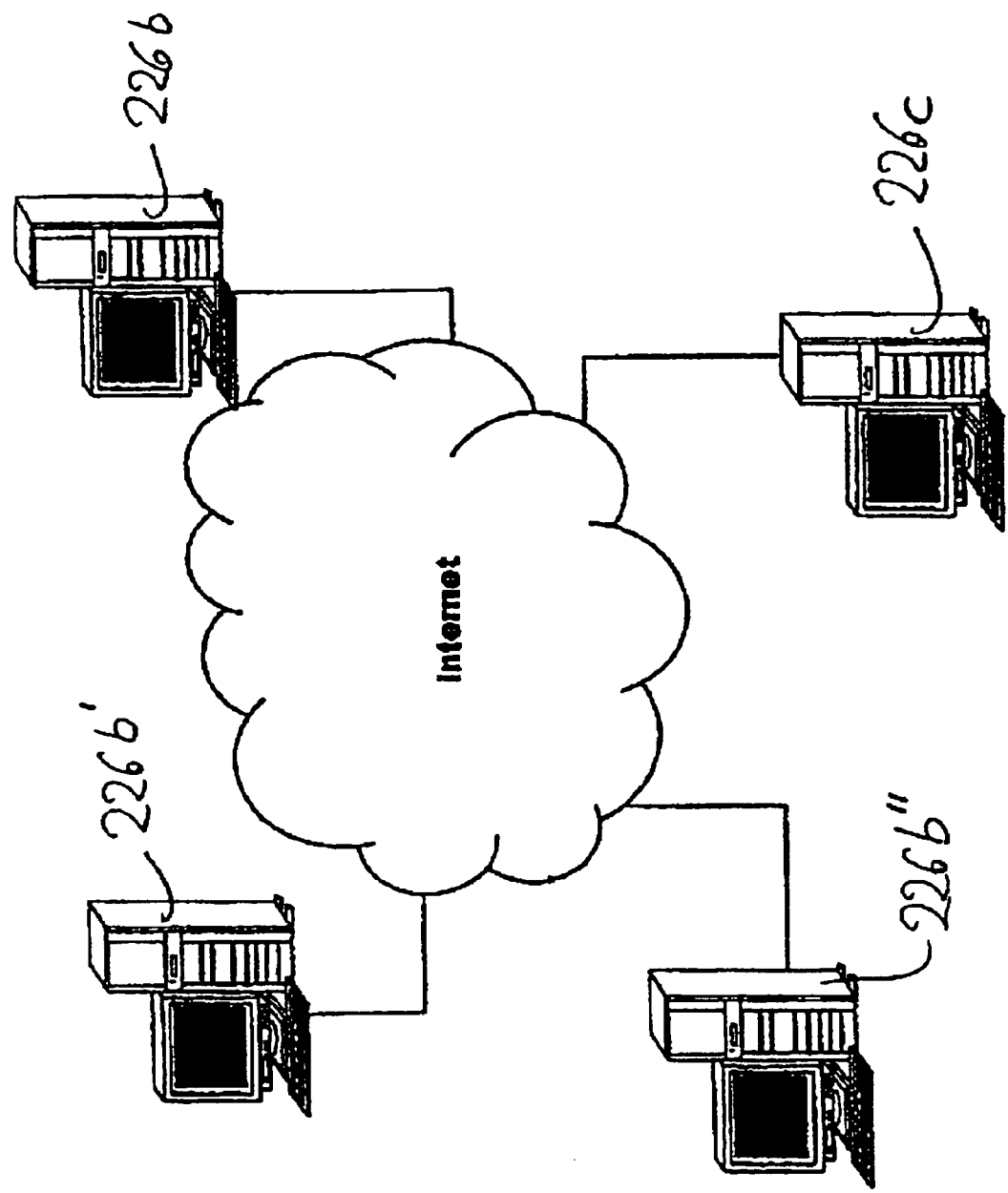
FIG. 4 shows an example of how two or more systems of the kind shown in FIGS. 2 or 3 can be included in an overall system with at least one higher-level computer unit.

An external servicing computer system 226b may be assigned to two or more systems of the kind shown in FIG. 2 and FIG. 3, namely two or more associations each comprising at least one internal servicing computer system 226a and connected or connectable office machines, and may receive servicing tasks therefrom. It may furthermore also be possible for remote servicing of the kind described in connection with FIG. 1 to be provided for assigned office machines directly from the external servicing computer system without involving an internal servicing computer system. It is possible to obtain data from this remote servicing and/or by the intermediary of a particular internal servicing computer system which are of significance to a higher-level organisation, for example the office machine manufacturer, for example in order to allow rapid identification of susceptible features of the office machine made by the manufacturer so that design modifications can then be put into effect as quickly as possible. In this manner, it is also possible to provide a rapid response with regard to previously supplied office machines. For example, the appropriate spare component may rapidly be provided or other preventive measures may be taken. It is expedient to collect such data in such a servicing organisation. In this connection, it is proposed that corresponding external servicing computer systems, which may belong to different servicing organisations, are connected or connectable to form an overall system, to which at least one further higher-level information computer system which collects the relevant information belongs. FIG. 4 shows such an overall system. Several "external" servicing computer systems 226b, 226b' and 226" are provided, as is an information computer system 226c, in particular a higher-level information computer system, assigned thereto, which actively retrieves appropriate data from the servicing computer systems or receives them from the servicing computer systems. Data transmission or retrieval may be made fully automatic. The information computer system 226c may furthermore transmit information of relevance to the servicing of the assigned office machines by data communication to the assigned servicing computer systems, for example information about spare parts, servicing instructions etc. Insofar as they are relevant to internal servicing computer systems of the same type as the above-described system 226b, such data may be transferred from the particular external servicing computer systems to the internal servicing computer system. The entire transfer of information from the internal office machine data up to the servicing computer system 226c and back down from the information computer system 226c to the external servicing computer system 226b and then optionally also to the internal servicing computer system 226a and, ultimately, when it is, for example, a matter of updating firmware or the like, down to the individual office machine may, if desired, proceed fully automatically without requiring intervention by operators. In general, however, it will be desired to provide for at least one confirmation to be given by an operator before such data are transferred. However, it may also be provided in order to achieve high levels of security for such data communication to proceed only when explicitly commanded by an operator.

An advantageous embodiment of the external servicing computer system which, depending on the development, may also accurately be called a computer-aided servicing management and support and reporting system, is described in greater detail below, as is a method for servicing management and/or for servicing support and/or for generating servicing reports which is preferably implemented or at least assisted by said servicing computer system.

A method for servicing management and/or for servicing support and/or for generating servicing reports which may advantageously be used in the context of or in combination with the invention may, for example, comprise the following steps or processes:

1. An operations department of a company which deals in or rents machines, for example office machines such as copiers, printers and fax machines or multifunction devices with corresponding functionalities, takes receipt of a communication from a customer about a malfunction in a device (arrow 100 in FIG. 6) and inputs corresponding data into a computer system (host computer system) 126. The computer system in question may be denoted the dispatcher computer system. The dispatcher computer, which could also receive corresponding "query or task data" automatically by data communication from a customer computer for example assigned to the office machines (for instance from the servicing computer 226a of FIG. 2), keeps master data in an assigned database which in particular includes machine data relating to machines potentially requiring servicing and customer data relating to customers for whom or on whose premises servicing interventions may be provided. The master data may advantageously also contain further data, for example data providing servicing history relating to individual machines and/or customers, for instance further details about servicing interventions which have been carried out in the past. The servicing history may, if desired, be restricted to a predetermined number of previous interventions (e.g. the last five interventions).

2. Servicing task data, which contain data identifying the malfunction, are transferred from the computer system 126 by electronic, preferably wireless, data communication, for instance via GSM, to a computer system 102 assigned to the technician (preferably a mobile computer system for instance a laptop computer). A servicing task data record, which could also be known as a service call, preferably contains at least the following data: complete address of the customer, location of the device, type of contract (servicing contract, lease or rental etc.), information about the device in question and, if known, about the type of malfunction, information about previous malfunctions (for example the last five malfunctions).

3. The data can be transferred, with transfer being initiated either by the computer system 126 or by the computer system 102, from the former to the latter computer system. For example, the user interface of the technician's system 102 may contain a menu item "Data exchange" which, once selected, initiates receipt of servicing task data and, if applicable, the transfer of report data relating to a preceding servicing intervention to the computer system 126.

4. On arrival at the customer's premises, the technician connects his/her computer system 102, for example via an RS232 interface, to a device 10, for example a copier, which is affected by the malfunction or requires servicing. The technician can then retrieve internal machine data by means of the computer system 102 by electronic data exchange (arrow 101 in FIG. 6), for example: machine serial number, total counter, configuration data, error messages (preferably with detailed description), assembly counters (e.g. fixer or heater unit etc.) and part counters (for example copying drum, heated rollers, feed rollers etc.).

5. The technician then carries out the repair/servicing, possibly on the basis of the data which have been read out from the device 10.

6. By means of the computer system 102 connected to the machine 10, the technician then resets the counters of the serviced or replaced assemblies/parts and optionally also a servicing counter to zero and optionally sets configuration data (arrow 101 in FIG. 6).

7. The technician then uses the computer system 102 to generate a servicing report, into which report data from the servicing task data record are automatically inserted by data transfer within the computer, for example complete customer data, type of contract etc. Internal data which have been read out from the machine 10 concerned are also incorporated into the servicing report by data transfer within the computer. The technician additionally inputs relevant data, for instance relating to driving time, working time, nature of the visit (malfunction, servicing, installation etc.), spare parts used (unless automatically incorporated into the servicing report by data transfer within the computer).

8. The parts used or possibly replaced during servicing or remedying the malfunction are preferably checked for correctness by an appropriate functionality of the computer system 102 and, where spare parts have been taken from the technician's car stock, an order to replenish the car stock is automatically generated for transfer, for instance, to the spare parts warehouse. A reading device, for example a bar code reader 103, may be assigned to the computer system 102, said reading device enabling the reading in of parts numbers and the like in order to check for correctness and for reordering purposes.

9. It may be provided that the servicing report is printed out, for instance to be handed to the customer and/or as a backup in the event of data loss. One functionality of the mobile computer 102 which may advantageously be provided is the ability to use a fax machine on the customer's premises to print out the servicing report or a special "customer servicing report", preferably by wireless telecommunication over the public telecommunication network.

10. For example by selecting the menu item "Data exchange", the servicing report may then be transferred by electronic data communication, preferably via GSM, from the technician's computer system 102 to the central servicing organisation's computer system 126. In this connection, the next servicing task data record(s) can be received. The data received by the computer system 126 are then available, for example, for invoicing, ordering or reordering of spare parts and further customer support.

Figure 6:
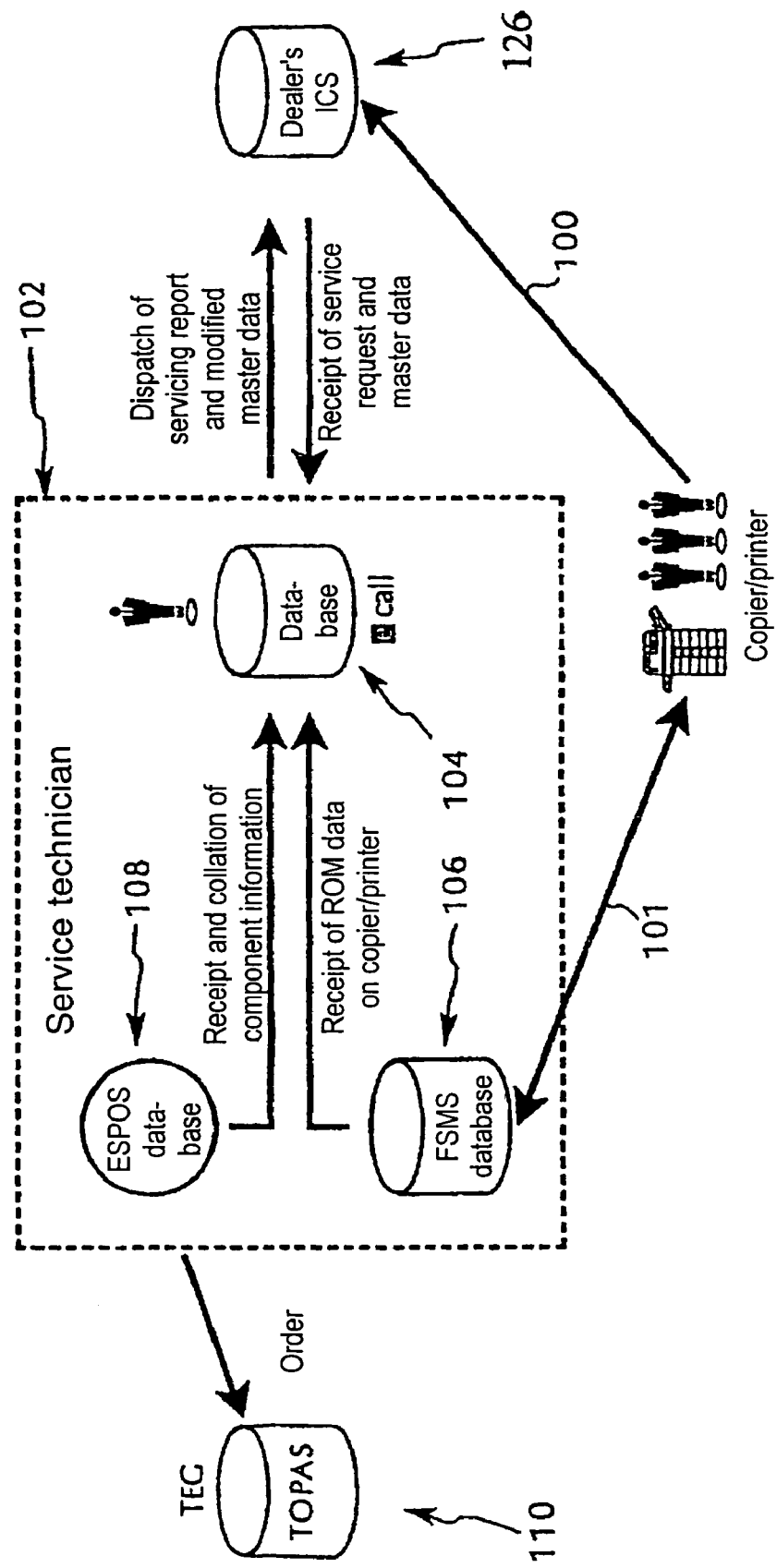
FIG. 6 shows a structure of the system of FIG. 5 with regard to the stored data and data flows.
Figure 7:
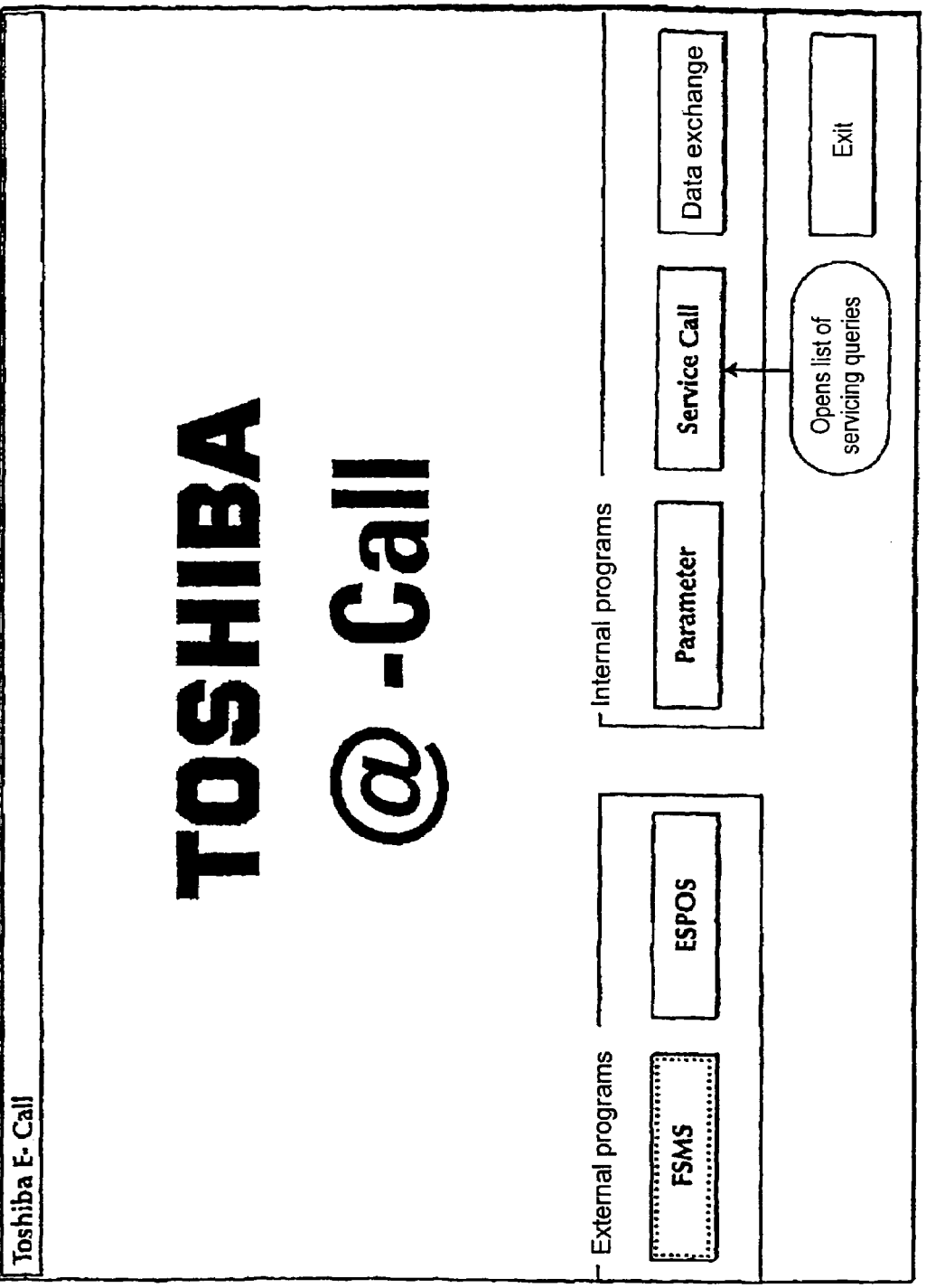
FIG. 7 shows a screen from a user interface for a computer system assigned to a technician and which is part of a system of the type shown in FIGS. 5 and 6.
Figure 8:
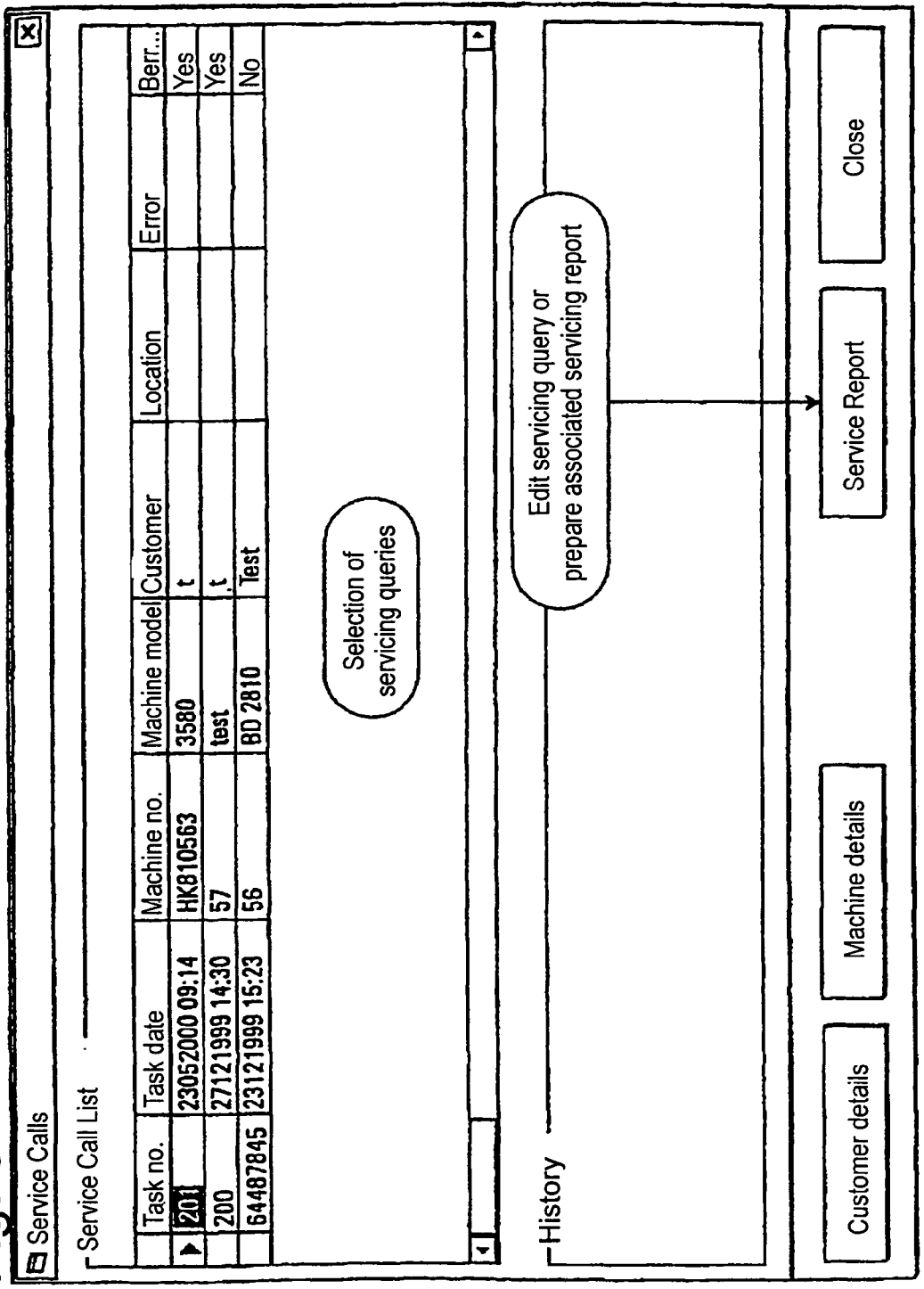
Figure 9:
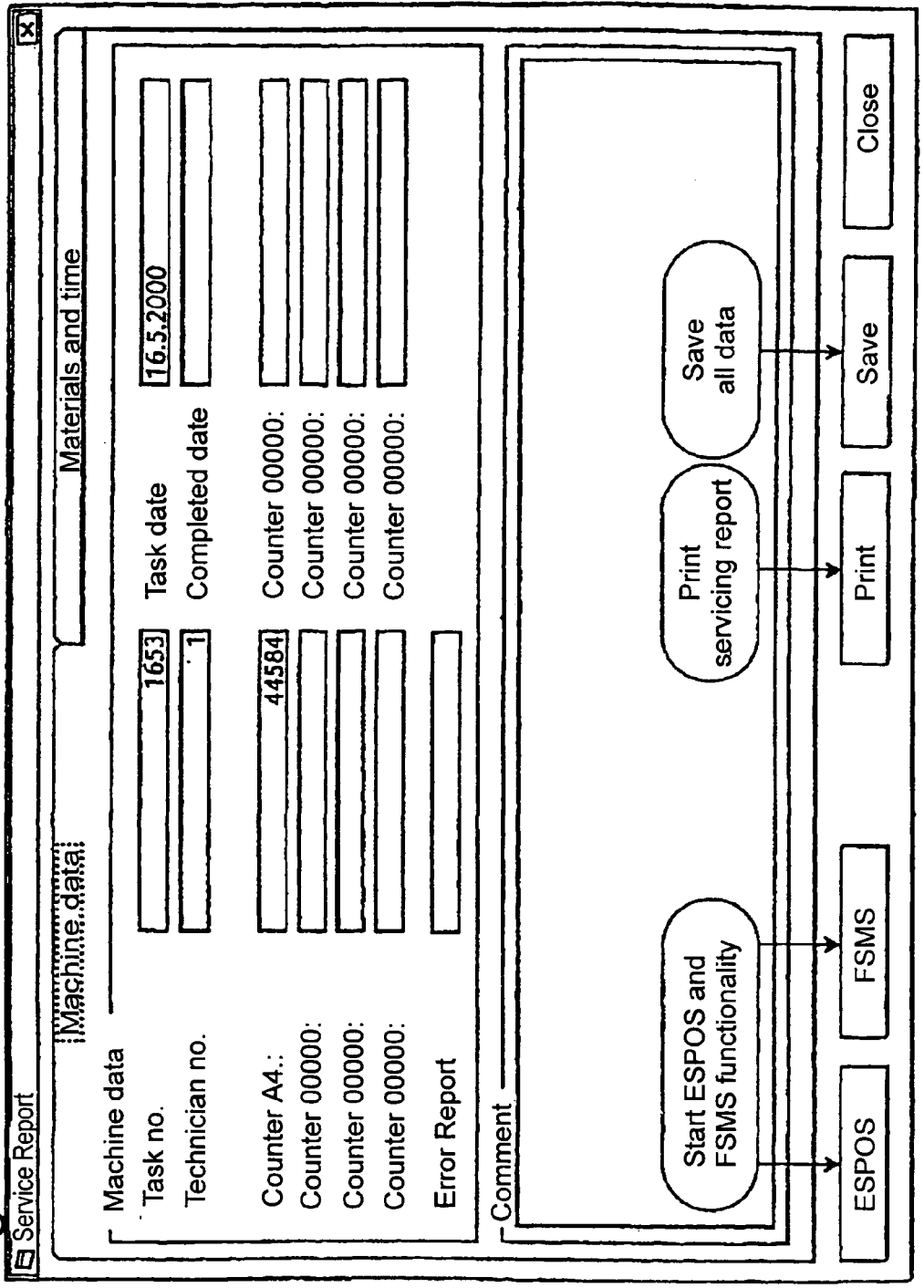

With reference to FIG. 6, it should also be explained that the computer system 126 may, for example, be part of an inventory control system (ICS). The technician's computer system 102 preferably contains three separate databases, namely a database 104 holding the servicing task data and the report data, a database 106 holding the data which have been read out from the particular machine and a database 108 containing spare parts data. In addition to a general "spare parts database", for example on CD-ROM, it is also possible to provide a "spare parts database" specifically relating to the technician's car stock. Order data need not necessarily be routed via the dealer's computer system 126, but, if desired, may instead also be transferred by electronic data communication from the technician's system 102 to a separate computer system 110, for example assigned to the machine manufacturer.

Preferably, the above-mentioned system provides the following functions, while the method provides the following steps:
import of master data and servicing requirements from a computer system which controls servicing, optionally from a dealer's or rental company's ICS;
import of internal device data (FSMS data; FSMS=Field Service Management System) from a device (for example a copier or printer; internal data comprise, for example, counter readings and error messages);
acceptance and display of detailed customer and machine/device data;
preparation of a servicing report;
preparation or provision of an installation report;
checking of components against a component database (e.g. ESPOS functionality or ESPOS system; ESPOS=Express Spare Parts Operation System);
generation of spare parts orders (external, for instance by TOPAS functionality or TOPAS system or via dealer ICS; TOPAS=Toshiba online Parts Assistance Service), in particular in relation to spare parts required for a device or devices for on-site fitting during a subsequent servicing intervention and/or in relation to spare parts for replenishing the car stock of spare parts;
dispatch of servicing reports to the servicing control system, in particular the dealer's or rental company's inventory control system.

The following advantages may, for example, be achieved:
reduction in servicing times due to data input in a single operation;
guarantee of correct parts numbers and servicing data;
immediate invoicing of servicing provided;
detailed description of error messages;
interface adapters can straightforwardly be provided for different dealer inventory control systems or the like;
simple, in particular consolidated, analysis of error data is possible on the basis of the report data;
relevant or affected databases can easily be updated.

Rapid preparation of the servicing report, provision of the master data and servicing requirements directly by the inventory control system of the organisation offering servicing (for instance dealer or general service provider), the reduction in servicing times, the guarantee of correct parts numbers and servicing data, the detailed description of error messages and the consolidated analysis of field data offer advantages both to the "service provider" and to the final customer. In combination with remote diagnostics or remote servicing according to FIG. 1, further advantages may be achieved, namely servicing cost economies due to a reduction in servicing visits and the permanent possibility of updating the particular device's operating software (firmware). Superfluous servicing visits can be avoided by direct querying of internal device data (in particular counter readings and error codes). The requirements of both large and small customers can effectively be met.

The following proposed solutions may in particular be advantageous:
servicing report data are directly input into a technician's system (for instance the technician's system 102);
servicing task data records ("service calls") and servicing reports are exchanged electronically between the technician's system and a host system, in particular the system 126;
data which have been read out from a customer device (FSMS data) are automatically incorporated into the particular servicing report;
order data, for instance for ordering spare parts, can be transferred electronically to an order processing system (for instance TEG/GO via ESPOS/TOPAS).

It is advantageous if the technician's system 102 provides at least some of the following functionalities:
import of primary or master data and servicing task data ("service calls") from the host system,
display of detailed customer and machine data,
preparation and provision of servicing reports,
preparation of installation reports,
import of internal device data (for instance error and counter information),
checking of suitability or applicability of spare or used parts (for instance via ESPOS),
production of order data (for instance for TOPAS),
transfer of servicing and installation reports to the host system.

The technician's system 102 may advantageously have interfaces to the following systems or devices:

to the host system of a servicing control organisation (for instance of a dealer) or to two or more such systems,
to devices relating to servicing tasks,
to an FSMS system (if not integrated in the technician's system),
to a parts database (for instance ESPOS), if not integrated in the technician's system,
to an order processing system (for instance TOPAS).

The following advantages may in particular simply and reliably be achieved:

correct parts numbers and servicing task data;
better quality of error data obtained;
data input in a single step;
possibility of consolidated analysis of internal data which have been read out from a plurality of machines;
greater reliability with regard to control of use of technicians;
modifications to customer data and configuration data can simply and reliably be transferred to the host system;
open interfaces to various host systems can be provided;
further use of appropriately processed data in an assigned inventory control system is straightforwardly possible.

The invention claimed is:

1. A system comprising a plurality of office machines and at least one servicing computer unit, wherein the particular office machine comprises an electronic control unit and a data communication interface, wherein internal data of the office machine may be read out and internal data of the office machine are settable via the data communication interface, wherein a computer unit is assigned to each of the office machines, which computer unit is capable of accessing internal data of the office machine and is designed to permit reading out of internal data of the particular office machine and setting of internal data of the office machine at least by data communication over a computer network, wherein the computer units assigned to the office machines and the servicing computer unit are in each case connected or connectable to a computer network and are designed such that the servicing computer unit can read out internal data of the office machine by data communication over the computer network and that internal data of the office machine can be set by the servicing computer unit by data communication over the computer network and/or internal operating software or firmware can be updated, wherein the servicing computer unit includes evaluation functionality for the automated evaluation of internal data which have been read out from the office machines and reporting functionality for the automated provision of report data and of reports based on the report data to a user interface on the basis of the data which have been read out and of the evaluation or evaluations performed, wherein at least one of the following evaluations proceeds automatically and corresponding report data are automatically provided:
a) preparation of user statistics,
b) preparation of cost evaluations,
c) preparation of information about services provided broken down by the particular office machine and by the assigned cost centres,
d) statistical evaluation of error messages and machine failures which occur, and
e) analysis of office machine capacity utilisation,
wherein the servicing computer unit includes notification functionality for the automated provision and optional dispatch of data relating to preventive and/or acute servicing operations on at least one of the office machines and/or of messages by data communication and/or telecommunication to at least one assigned communication device and/or at least one assigned further computer unit, and wherein the notification functionality is designed, as a function of the internal data which have been read out or of derived data based thereon, to select between two or more assigned communication devices and/or two or more assigned further computer units to which the data and/or messages relating to preventive and/or acute servicing operations on at least one of the office machines are to be provided or sent.

2. A system according to claim 1, wherein the particular computer unit is designed to query internal data of the office machine in accordance with a predetermined query scheme and/or to transfer report data based on the queried data to an assigned data communication address in accordance with a predetermined reporting scheme.

3. A system according to claim 1, wherein the particular computer unit comprises web server functionality or is configured or configurable as a web server.

4. A system according to claim 1, wherein the computer network includes the Internet and/or an intranet.

5. A system according to claim 1, wherein the computer network includes a LAN or WAN.

6. A system according to claim 1, wherein the particular electronic control unit constitutes the computer unit and the data communication interface takes the form of a computer network data communication interface or that the computer unit has its own computer network data communication interface.

7. A system according to claim 6, wherein the particular computer unit is connected or connectable to the data communication interface of the office machine.

8. A system according to claim 7, wherein the data communication interface of the particular office machine comprises a serial interface and/or a parallel interface and/or an Ethernet interface.

9. A system according to claim 1, wherein the particular office machine takes the form of a copier and/or printer and/or fax machine and/or scanner or, in the case of a multifunction device, has corresponding functionalities.

10. A system according to claim 9, wherein concerning the particular office machine at least some of the following internal data may be read out over the computer network:
serial number of the device and/or at least one internal component of the device,
counter reading of a total counter assigned to all paper sources and/or duplicating units of the device,
at least one counter reading of a servicing counter and/or accounts counter and/or at least one other counter, optionally at least one counter reading assigned to an individual paper source of the device and/or at least one counter reading assigned to an individual duplicating unit of the device,
error messages and/or other status data,
configuration data, and
operating software or firmware version.

11. A system according to claim 10, wherein at least configuration data of the particular device are settable and/or at least one counter is resettable over the computer network.

12. A system according to claim 10, wherein internal operating software or firmware of the particular office machine can be updated over the computer network.

13. A system according to claim 1, wherein the data communication for reading out or setting the internal data can be initiated over the computer network by an assigned, optionally external servicing computer unit.

14. A system according to claim 1, wherein the servicing computer unit is in communication with computer units which are assigned to a first group of office machines and that the servicing computer unit is in communication over a second computer network with computer unit, which are assigned to at least one further group of office machines.

15. A system according to claim 14, wherein the first computer network includes a LAN, WAN or intranet.

16. A system according to claim 15, wherein the second computer network includes the Internet.

17. A system according to claim 14, wherein the assigned further computer unit is assigned to a computer-aided servicing management and/or support and/or reporting system comprising:
- a first computer system including the further computer unit, which computer system keeps master data relating to customers and/or machines potentially requiring servicing, for example office machines such as copiers, printers, scanners and fax machines or multifunction devices comprising corresponding functionalities, in a database and into which query data relating to servicing queries can be input; and
- at least one mobile second computer system which comprises a data communication interface for receiving servicing task data from the first computer system by data communication, in particular by wireless data communication, and for sending report data relating to servicing tasks which have been completed and/or are under way and/or to follow-up servicing tasks and optionally spare parts order data to the first computer system by data communication, in particular by wireless data communication; and
- wherein, on the basis of the master data and the query data, the first computer system automatically generates servicing task data and transfers the latter to the second computer system, optionally initiated by the latter, by data communication and/or wherein the second computer system automatically transfers report data to the first computer system by data communication.

18. A system according to claim 17, wherein the notification functionality is designed, as a function of the internal data which have been read out, to input query data relating to servicing queries into the first computer system by means of the further computer unit.

19. A system according to claim 17, wherein the reporting functionality is designed to send report data to the first computer system by means of the further computer unit.

20. An overall system comprising the system according to claim 17 and the computer-aided servicing management and/or support and/or reporting system assigned thereto and mentioned in claim 17.

21. An overall system comprising two or more systems according to claim 17 and a common computer-aided servicing management and/or support and/or reporting system assigned thereto as mentioned in claim 17.

22. An overall system comprising two or more systems according to claim 20 and a common computer-aided information system assigned thereto comprising at least one computer system which keeps information data relating to office machine models and the servicing thereof in a database for retrieval by and/or for sending to a particular servicing management and/or support and/or reporting system by data communication, and/or which has a functionality for receiving and storing in a database and optionally evaluating report data transferred from the servicing management and/or support and/or reporting system by data communication.

23. A system according to claim 1, wherein the servicing computer unit has a broadcast and/or search functionality which, over the computer network, recognises the assigned office machines by means of the particular assigned computer unit.

24. A system according to claim 23, wherein the broadcast and/or search functionality responds to recognition of a particular newly assigned office machine and reads out a predetermined data record of internal data from said office machine over the computer network and processes and/or stores it in a predetermined manner.

25. A method for supporting and/or remotely servicing and/or managing a plurality of office machines and/or for providing information relating to at least one of the office machines, characterised by reading out of internal data of at least one of the office machines and/or setting of internal data of at least one of the office machines by wireless data communication and/or by data communication over a computer network and/or by data communication over a modem connection, and by the use of a system according to claim 1.

* * * * *

UNITED STATES PATENT AND TRADEMARK OFFICE
CERTIFICATE OF CORRECTION

PATENT NO.        : 7,355,730 B2
APPLICATION NO.   : 10/472404
DATED             : April 8, 2008
INVENTOR(S)       : Dirk Landau Page 1 of 1

It is certified that error appears in the above-identified patent and that said Letters Patent is hereby corrected as shown below:

On the Title Page, should read, Item -- (22) PCT Filed: March 12, 2002 --

Signed and Sealed this

Eighth Day of July, 2008

JON W. DUDAS
*Director of the United States Patent and Trademark Office*